Feb. 11, 1941.  F. PRESCOTT ET AL  2,231,681
PARKING METER
Filed July 8, 1938  2 Sheets-Sheet 2
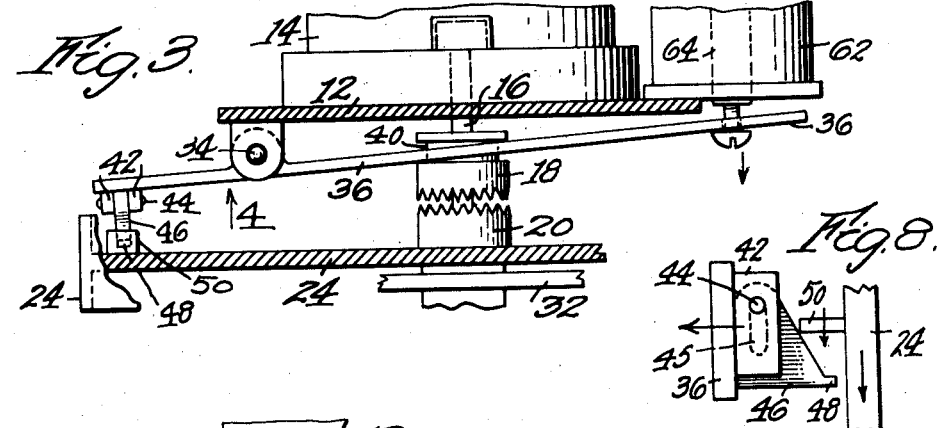
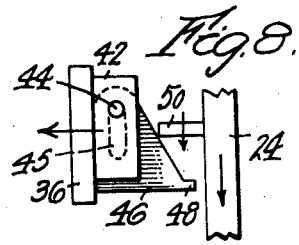
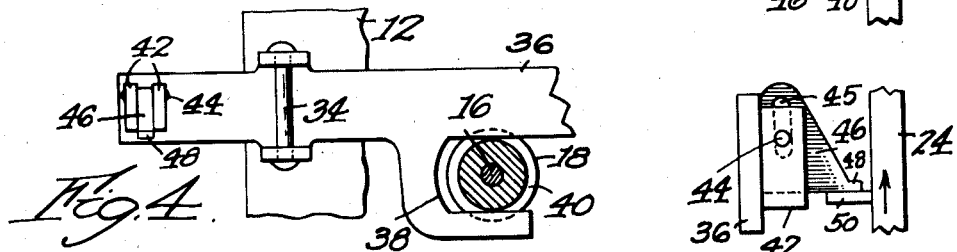
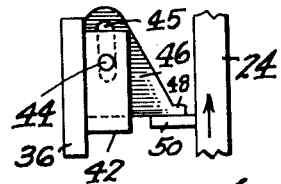
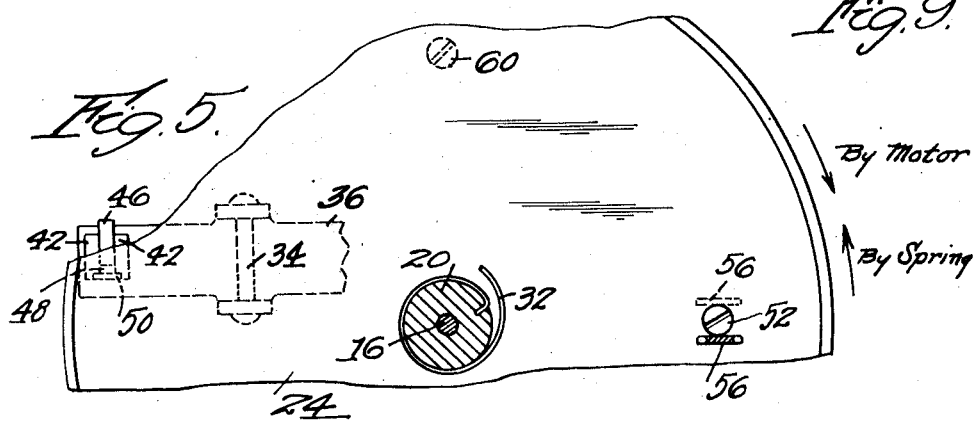
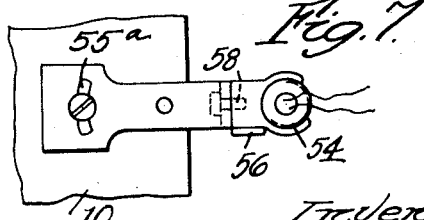
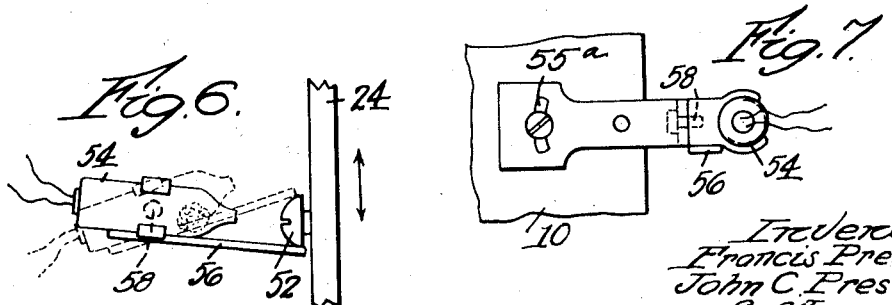
Inventors
Francis Prescott
John C. Prescott
By attorney
Charles R. Pratt Patented Feb. 11, 1941

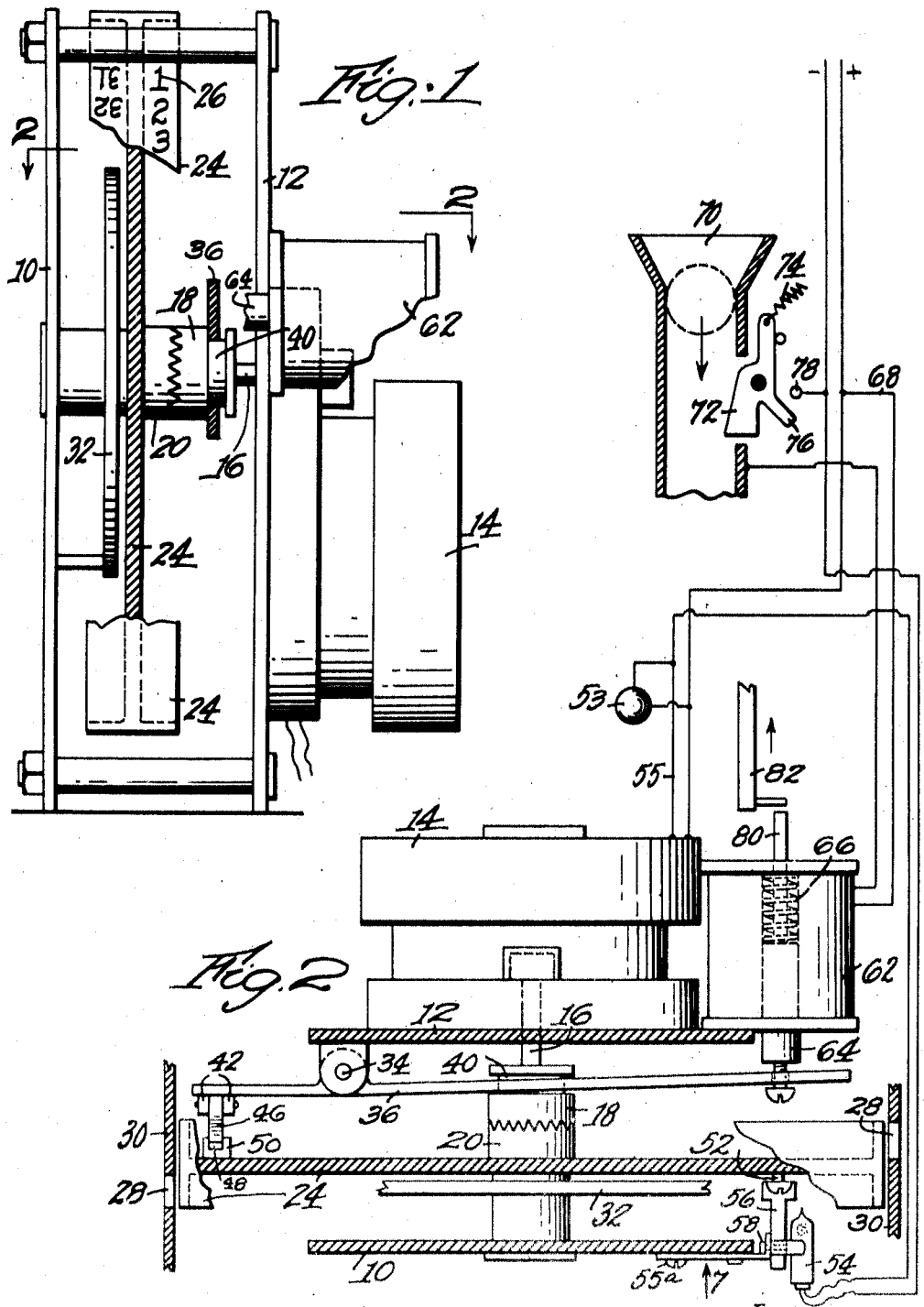

2,231,681

UNITED STATES PATENT OFFICE 2,231,681

PARKING METER

Francis Prescott and John C. Prescott, Grafton, Mass.

Application July 8, 1938, Serial No. 218,136

9 Claims. (Cl. 194—9)

This invention relates to a meter for showing when an automobile has been parked beyond the time limit and for other purposes.

The principal objects of the invention are to provide simple and convenient means whereby the insertion of a coin will, unassisted, close a circuit through an electromagnet, release a dial to allow it to be restored to a predetermined position and at the same time actuate a mercury, or other switch to start the dial rotating by the action of a motor; to provide means whereby the completion of the rotation of the dial through a predetermined length of time will result in the disconnection of the dial from the source of power; to provide means, in the form of a magnetically operated member, for setting the dial into operation through the opening of a clutch and closing it again by a cam, or the like; to provide means whereby the dial can be set up to operate for different periods of time, as for example, a quarter of an hour, a half hour or an hour; to provide a meter and signal light for showing when a predetermined amount of time has elapsed, in which the operation will be entirely automatic with the exception of the depositing of a coin, and to provide means whereby, if a user employs the meter only a part of his allotted time, the meter will go back to zero whenever the next user deposits a coin and then start and the meter will need no attention meanwhile.

Other objects and advantages of the invention will appear hereinafter.

Reference is to be had to the accompanying drawings, in which

Fig. 1 is a side elevation, partly in section, of a parking meter constructed in accordance with this invention;

Fig. 2 is a sectional view on the line 2—2 in Fig. 1;

Fig. 3 is a view similar to that shown in Fig. 2, but with parts broken away and showing the clutch sections disengaged;

Fig. 4 is a view looking in the direction of arrow 4 in Fig. 3, showing the clutch lever and associated parts;

Fig. 5 is a side view of the dial with parts broken away, and showing the positions of the dial lugs at the ends of the dial travel;

Fig. 6 is a side view of the mercury switch in its two positions;

Fig. 7 is a side view of the switch of Fig. 6, looking in the direction of arrow 7 in Fig. 2;

Fig. 8 is an enlarged side view of the cam, showing the clutch lever in the act of being moved by a dial lug under influence of the dial spring to engage the clutch sections; and Fig. 9 is a similar view of the parts of Fig. 8 but showing the relation thereof at the end of the travel of the dial by the motor.

The operating parts of the meter embodying the present invention are carried on a frame composed of connected, parallel plates 10, 12. A mechanism including an electric motor 14 is mounted on plate 12 and drives a shaft 16 when the power is on. Shaft 16 carries a relatively non-rotatable but axially slidable clutch section 18, intermediate its ends, said clutch section being adapted for engagement with the cooperating clutch section 20, the latter being freely journaled on the shaft 16, but not slidable thereon. The clutch section 20 rigidly mounts a dial plate 24 which turns therewith, under influence of motor 14, when the sections 18, 20 are engaged and the current is on.

The periphery of the dial is provided with single or double scales 26 which may be observed thru the opposite windows 28 in a housing 30 which fits over the device. These scales may be graduated in minutes to denote the passage of time, the motor 14 being designed to operate at a speed commensurate with the scale divisions.

A spring 32 is fixed at one end to clutch section 20, hence, in effect, to the dial, and at the other end to the plate 10, and is so coiled about clutch section 20 as to be tensioned upon driving of the dial 24 by motor 14. Therefore, whenever the clutch sections 18, 20 are disengaged after the motor has turned the dial, spring 32 will return it to original position. As shown by the arrows in Fig. 5, the motor turns the dial clockwise and the spring turns it counter-clockwise.

Mounted on a vertical pivot 34 on plate 12 is a lever 36 having a slot 38 for engagement with a groove 40 in the clutch section 18. Clearly, if the lever is swung counter-clockwise about pivot 34 in Fig. 2, the clutch sections 18, 20 will be separated, and they will be brought together if the lever is swung clockwise in this figure. At one end of the lever, there are mounted parallel plates 42 having a stud 44 therebetween, and arranged to bear against a side face of the lever, there is a triangular cam 46 having a slot 45 in which the stud 44 is arranged, so that the cam may rise and fall with relation to the lever. A foot 48 is provided at the bottom of the cam 46, this foot extending toward the dial 24, and the cam 46 being generally normal to the dial as seen in Fig. 2.

A lug 50 is positioned on the side of the dial facing the lever 36, and this lug is so arranged as to engage the foot 48 on the cam and move the same upwards to about the limit of slot 45 when the dial rotates clockwise under influence of the motor. As described below, the motor is always automatically stopped when this happens, so that the lug 50 never tends to urge the lever 36 upwards but only the cam. The vertical movement of the cam is only to allow the lug to make a complete revolution, if this becomes necessary under certain conditions, since if the cam could not move slightly upwards, then the lug could only rotate around shaft 16 from a point above the foot 48 to a point below it, and the rotation of the lug would thus be short of a full rotation by a distance equal to the thickness of the foot 48. Incidentally, it is to be noted that the lug 50 cannot move past the foot in either direction, and if the dial, in its clockwise movement, is stopped by cessation of the motor, so that the lug does not reach the foot 48, the slot 44 becomes unnecessary and may be dispensed with. This effect depends upon structure to be now described.

A second lug 52 is secured to the face of the dial preferably opposite from the lever 36 and this lug may be positioned on the other side of the clutch section 20 from the lug 50, as shown in Figs. 2 and 5. The purpose of lug 52 is to open or close a mercury or other switch 54 adjustably mounted on plate 10 by a slot and screw connection 55ª, and which is connected to a lever 56 mounted to pivot on a horizontal pin 58. The lever 56 is held in position where placed by the friction of the pivot pin. As shown in Fig. 6, in full lines, the switch will be in off position, and is so positioned by engagement of lug 52 with the end of lever 56 in the clockwise rotation of the dial under influence of the motor. Switch 54 controls the current to the motor and signal light 53 thru line 55 so that when it is turned to off position, as just described, the motor and dial stop. Therefore, the relative angular positions of lugs 50 and 52 on the dial, will determine whether or not the lug 50 will contact and elevate the cam 46. It is contemplated that an additional lug 60 may be placed where desired on the dial in the same radius as lug 52 for varied lengths of operation of the dial in its metering action.

The dotted line showing in Fig. 6 indicates the on position of the switch 54, and the switch is moved from off to on by contact of the lug 52 from below in its counterclockwise movement, i. e., when dial 24 is moved around shaft 16 by the spring 32 from dotted line showing of lug 52 to full line position, see Fig. 5. As soon as this occurs, the motor is started, and rotates the dial clockwise, so that lug 52 now moves downwardly away from the switch, but the friction of the pin 58 makes the lever 56 and hence switch 54 remain in on position until again turned to off position by the clockwise action of the lugs 52 or 60, as the case may be. Incidentally, lugs 52 or 60 never actually move past the lever 56, only engage and tilt it.

A solenoid 62 having a plunger 64 extending therefrom is mounted on the plate 12, and the exposed end of the plunger is loosely connected to the end of lever 36 remote from the cam 46 (so that the plunger can move in the direction of the arrow in Fig. 3, without returning the lever 36). A spring 66 keeps the plunger normally extended, but when current flows in circuit 68, the plunger is withdrawn into the solenoid against the action of the spring, and of course the clutch section 18 will be withdrawn from the clutch section 20. It is to be noted that if the clutch sections are disengaged, the spring 32 turns the dial counterclockwise (Fig. 5), but when the sections are engaged, the dial is turned clockwise, or merely locked, by the friction of the motor parts, depending upon whether the motor is running or idle.

A coin chute 70 mounted on housing 30 is provided with a lever 72 which is pivoted as shown in Fig. 2, and the lever has a coil spring 74 to maintain it in position in the chute. The circuit 68 is so arranged as to be closed when the lever 72 is depressed by a coin sliding down the chute, and open at all other times. This is accomplished by means of the contact arm 76 and contact 78 in its path.

The plunger 64 is provided with an arm 80 to actuate the counter 82.

The operation of the device is as follows: Assuming the meter to be in its normal inactive condition, as represented in Fig. 2, the clutch sections are closed, locking the dial in place, the motor is not running, and switch 54 is open. The dial is under spring tension and the lug 50 is in dotted line position and lever 56 is in solid line position, as shown in Fig. 5, both lugs being in the solid line positions, Fig. 2. A coin is dropped in the chute 70 engaging the arm 76 to close the circuit 68 momentarily, but long enough to apply sufficient current to the solenoid to retract plunger 64. This pivots lever 36 counterclockwise, as seen in Figs. 2 and 3, and thus separates the clutch sections 18, 20. The clutch being open, the dial is quickly rotated counterclockwise (Fig. 5) by the spring 32, lug 50 moving downwardly from cam 46, and lug 52 moving upwardly from lever 56, until lug 50 engages the inclined surface of cam 46, and riding down it, forces lever 36 clockwise in Figs. 2 and 3, thus again engaging the clutch sections 18, 20. This action is shown by the arrows in Fig. 8, lug 50 being in a position wherein lever 36 is being moved to the left, Fig. 8, and clockwise, Figs. 2 and 3, by said lug 50.

At this instant, lug 52 engages lever 56 from below, pushing it up about its pivot 58 to dotted line position, Fig. 6, and closing the motor circuit 55. The dial is thus reversed and begins to rotate clockwise (Fig. 5) against the spring tension and meters the time until lug 52 or 60, as the case may be, has made contact with lever 56 from above to turn it down to off position of the switch 54. The motor now stops, the spring 32 is wound up, but the clutch sections 18, 20, being still engaged, lock the dial, by the friction and inertia of the motor parts, and it cannot move until such time as the plunger 64 is again retracted by a coin deposit to release the locking clutch sections.

If the meter is so arranged as to operate for the full revolution of the dial, as here shown, it is at this instant that lug 50, rising, strikes the bottom of foot 48 on cam 46, and pushes the same upwardly. Of course, if lug 60 is arranged to open switch 54 for a shorter time than a full revolution of the dial, the lug 50 does not contact foot 48 and the slot connection 44 is not used.

Of course, the dial is originally set in a predetermined position so as to correctly show the scale end thru the windows 28, and with spring 32 tensioned.

Now, if another party, during the period while the disc is moving the stop 22 clockwise toward the mercury switch, parks his car and drops a coin into the slot, the first effect of that is just as stated above, to open the clutch. The spring 32 turns the dial counterclockwise back to zero again, as shown in Fig. 3, and the clutch is closed by the action of the stop 50 on the cam 46.

It will be seen, therefore that, without any manual or other operation, such as pulling a lever or the like, the device is always in condition to receive a coin and to start automatically. Even if one party parks only a short time, leaving the instrument going, the deposit of another coin will start the machine going again from zero with no time lost, because the spring 32 immediately puts the machine in condition for operation.

It is an important advantage that the party who is parking his car does nothing to the parking meter except to deposit a coin. He does not have to do anything to stop or start for the next party, no matter whether the car has been parked for the whole time or not. It is all automatic, being started and stopped only by the deposit of a coin. A second motorist desiring to park can deposit a coin whether the clock has stopped or not, and can get a full hour's parking. If necessary the instrument can be heated very easily to prevent freezing without disturbing it by placing a thermostat or electric heating unit within the case.

Having thus described our invention and the advantages thereof, we do not wish to be limited to the details herein disclosed, otherwise than as set forth in the claims, but what we claim is:

1. In a parking meter, the combination of a time measuring and indicating device having a motor, a dial adapted to be rotated by said motor, means carried by the dial for connecting the motor with, and disconnecting it from, a source of power, a motor shaft, a two part clutch, one part slidable on and rotatable with said shaft, the other part fixed to the dial and rotatable freely on said shaft when the clutch sections are not connected, a coin chute, a circuit adapted to be momentarily closed, when a coin is introduced into the coin chute, means operated by the closing of said circuit for unclutching the clutch, means for immediately rotating the dial to a predetermined position, whether the dial is running or not, and means operated by the dial for clutching the two sections of the clutch together again so that the dial will be rotated by the motor throughout the prescribed period of time, said motor driven rotation of the dial being in a reverse direction from said rotation to the predetermined position.

2. In a parking meter, the combination with a motor, a motor circuit connected with a source of power, a motor shaft having a clutch section always rotatable with the shaft but slidable with respect thereto, a time indicating rotary dial, a clutch section fixed to the dial and rotatable on said shaft, the clutch sections being arranged and adapted to be closed when the device is not operating, means operated by the dial for closing and opening the motor circuit, a coin chute, means, controlled by the deposit of a coin in the chute, for disconnecting the clutch sections, a spring arranged around the shaft and connected with the dial for turning the dial back to its starting position when the clutch sections are disconnected, a pawl on the dial, a cam in position for the pawl to operate it, a lever on which the cam is mounted, said first clutch section being connected to move back and forth with said lever, whereby the movement of the lever by the pawl will close the clutch and start the dial moving from its starting position, this movement being opposite to the dial movement caused by the spring.

3. In a parking meter, the combination with a dial, a motor for operating said dial, a motor shaft, a circuit in which said motor is located, a switch in said circuit, a clutch comprising two sections, one fixed to the dial and freely rotatable on the motor shaft, the other movable on the motor shaft longitudinally but rotatable with it, a lever connected with the movable section of the clutch to move it back and forth, a cam mounted on the lever, a pawl on the dial for engaging the cam and turning the lever so as to bring the clutch sections into operative connection, means operated by the deposit of a coin for opening the clutch, means to reversely turn said dial to starting position, the clutch being closed by the movement of the lever by the pawl on the dial, and a stop on the dial for opening the switch and stopping the motor when the dial has rotated through a predetermined length of time.

4. In a parking meter, the combination with a dial, a motor for operating said dial, a motor shaft, a circuit in which said motor is located, a mercury switch in said circuit, a clutch comprising two sections, one fixed to the dial and freely rotatable on the motor shaft, the other movable on the motor shaft longitudinally but rotatable with it, a lever connected with the movable section of the clutch to move it back and forth, a cam mounted on the lever, a pawl on the dial for engaging the cam and turning the lever so as to bring the clutch sections into operative connection, a magnet, a circuit for operating the magnet adapted to be closed by the deposit of a coin, said magnet having a plunger provided with a head to engage the lever to open the clutch when the coin is first introduced, means to reversely turn the dial to starting position, the clutch being closed by the movement of the lever by the pawl on the dial, a stop on the dial for opening the switch and stopping the motor when the dial has rotated through a predetermined length of time, a shaft projecting beyond the plunger, and a counter in position to be operated by the shaft to count one on the counter when the plunger is moved inwardly in the magnet.

5. In a parking meter, the combination of a coin chute, a pivoted lever adapted to be engaged by a coin, when it is introduced into the chute, said lever normally resting by gravity in a position in which the coin will engage it and move it, an electric contact in position to be engaged by the lever when so moved, an electric circuit adapted to be completed when the electric contact and lever are in contact, a motor, a dial, a normally-closed clutch for connecting the motor and dial, means operated by said circuit for opening the clutch, and automatic means for turning the dial backward when the clutch is open.

6. In a parking meter, the combination of a motor, a dial adapted to be rotated in one direction by the motor, a two-part clutch operatively arranged between the motor and the dial, said clutch parts being normally engaged, means for disengaging said clutch parts upon introduction of a coin, whether the dial is running or not, means for rotating the dial in the opposite direction when the clutch parts are disengaged, means for stopping said opposite rotation at a predetermined point, and means operated by the dial for reengaging the clutch parts.

7. In a parking meter, the combination with a driven shaft, a motor for driving the same in one direction, a switch in the circuit of said motor for opening and closing the circuit at the desired time, a rotary dial, means whereby the dial may be engaged, or disengaged with relation to the shaft, means disengaging the dial from the shaft upon deposit of a coin, means driving the dial in an opposite direction upon such disengagement to a predetermined starting position, and means immediately reengaging the dial and shaft.

8. In a parking meter, the combination with a driven shaft, a motor for driving the same in one direction, a switch in the circuit of said motor for opening and closing the circuit at the desired time, a rotary dial, a lug on said dial to engage and operate said switch at predetermined intervals, means whereby said dial may be engaged or disengaged with relation to said shaft, means disengaging the dial from the shaft upon deposit of a coin, means driving the dial in an opposite direction upon such disengagement to a predetermined starting position, means immediately reengaging the dial and shaft, at which time said lug operates said switch to close the motor circuit.

9. In a parking meter, the combination of a motor, a dial adapted to be rotated in one direction by said motor, a two-part clutch operatively arranged between said motor and dial, one part of said clutch being mounted on an arm of a lever for engagement and disengagement therewith of the other clutch part, a cam on said lever, said clutch parts being normally engaged, means for moving said lever in a direction to disengage said parts upon introduction of a coin, whether the dial is running or not, means for rotating the dial in the opposite direction when the clutch parts are disengaged, means for stopping said opposite rotation at a predetermined point, means on the dial engaging said cam and moving said lever in the opposite direction to reengage said clutch parts.

FRANCIS PRESCOTT.
JOHN C. PRESCOTT.